United States Patent [19]

Fecik et al.

[11] Patent Number: 4,579,573
[45] Date of Patent: Apr. 1, 1986

[54] FORMING GLASS SHEETS OF SPECIALIZED ASYMMETRIC CONFIGURATIONS

[75] Inventors: Michael T. Fecik, New Kensington; John J. Ewing, Tarentum, both of Pa.

[73] Assignee: PPG Industries, Inc., Pittsburgh, Pa.

[21] Appl. No.: 685,011

[22] Filed: Dec. 21, 1984

[51] Int. Cl.$^4$ ............................................. C03B 23/035
[52] U.S. Cl. ..................................... 65/106; 65/182.2; 65/273; 65/287; 294/65
[58] Field of Search ...................... 65/106, 182.2, 273, 65/287; 294/65

[56] References Cited

U.S. PATENT DOCUMENTS

| | | | |
|---|---|---|---|
| 4,058,200 | 11/1977 | Frank | 198/382 |
| 4,185,986 | 1/1980 | Frank | 65/287 |
| 4,187,095 | 2/1980 | Frank | 65/104 |
| 4,197,108 | 4/1980 | Frank et al. | 65/273 |
| 4,204,853 | 5/1980 | Seymour | 65/106 |
| 4,252,552 | 2/1981 | Frank | 65/106 |
| 4,272,274 | 6/1981 | Frank et al. | 65/273 |
| 4,437,872 | 3/1984 | McMaster et al. | 65/273 X |

*Primary Examiner*—Arthur Kellogg
*Attorney, Agent, or Firm*—Andrew C. Siminerio

[57] ABSTRACT

A vacuum press for shaping both left and right hand sidelights, quarterlights and the like which are asymmetric in bend and mirror images of each other. The shaping surfaces of the mold have certain overlapping shaping areas that shape both the left and right hand windows and additional shaping areas bend only the left or right hand window. A timing sequence positions each glass sheet to be bent at the correct location between the shaping surface of the molds.

8 Claims, 5 Drawing Figures

FORMING GLASS SHEETS OF SPECIALIZED ASYMMETRIC CONFIGURATIONS

FIELD OF THE INVENTION

This invention relates to the shaping of heat deformable materials and in particular, to the shaping with a single system of both the left and right hand sidelights, quarterlights and the like which are asymmetric in bend and mirror images of each other.

BACKGROUND OF THE INVENTION

Shaped glass sheets are widely used as side windows in vehicles such as automobiles and the like. To be suitable for such an application, flat glass must be precisely shaped to the curvature defined by the window opening. In commercial production of shaped glass sheets, the glass is heated to its softening point by passing it through a tunnel type furnace. After heating the glass, it passes into a shaping station where a lower transfer mold lifts the glass into engagement with an upper vacuum shaping mold. The vacuum mold holds the shaped glass while the transfer mold retracts. The shaped glass is then released from the vacuum and transferred to a cooling station where it is exposed to a tempering medium to impart at least a partial temper in the shaped glass sheet.

In designing automobiles, it is common practice to have opposite side windows mirror images of each other, that is, the left hand side window is a mirror image of the right hand side window. The windows have the same curvature but in opposite directions. Because these curvatures are often complex in nature, for example, curvature that is asymmetric along the transverse and/or longitudinal center line, separate shaping molds are required to fabricate each window. As a result there is production time lost while molds are being switched and realigned.

It would be highly desirable to have an apparatus that can shape both left and right hand mirror image windows that have complex shapes. Such an apparatus would have a mold with a shaping face capable of shaping both glass sheet shapes.

PATENTS OF INTEREST

U.S. Pat. Nos. 4,272,274 and 4,197,108 to Frank et al. and U.S. Pat. Nos. 4,187,095; and 4,185,986 to Frank each lift a heated glass sheet in a lower slotted mold into engagement with an upper vacuum mold. The vacuum mold shapes the glass sheet and holds it against its shaping surface while the lower mold retracts. The vacuum mold deposits the glass on a ring-like structure which moves beneath the shaped glass sheet. The molds are constructed large enough so that an entire family of glass sheets, all curved along the same radius of curvature but being different sizes, could be pressed with the same mold assembly. Only left and right hand windows having constant curvature in both the longitudinal and transverse direction are capable of being formed with these assemblies.

U.S. Pat. No. 4,252,552 to Frank discloses shaping heat softened glass sheet to different curved configuration without changing mold by lifting a lower mold with an upwardly facing shaping surface having a certain bend and transferring the sheet to an upper vacuum mold having a downwardly facing shaping surface with a lesser sharpness of bend. The molds have cylindrical bends along the horizontal axis. The shaped glass is dropped onto a ring-like structure that changes the curvature of the shaped glass when additional forming is required.

SUMMARY OF THE INVENTION

The present invention provides a method and apparatus for shaping heat deformable sheets that are mirror images of the others with a single press system. The invention is particularly suited for shaping left and right hand sidelights, quarterlights, and the like for use in motor vehicles.

The invention includes an upper mold with a shaping surface having a plurality of sheet shaping areas. These areas form a first and second sheet shaping region having common overlapping sheet shaping areas. Sheets are selectively positioned in a first position for engagement with the first sheet shaping region and a second position for engagement with the second sheet shaping region. The plurality of sheet shaping areas include a central area, a first end portion adjacent to and continuous with the central area and a second end portion continuous with the central area and oppositely disposed from the first end portion. The first shaping region includes the central area and the first end portion while the second shaping region includes the central area and the second end portion. A lower mold is positioned generally below the upper mold, and has an upwardly facing sheet engaging surface that complements the sheet shaping area of the upper mold.

The apparatus further includes controls to detect the movement of the sheet as it is conveyed from a heating furnace to the molds and actuate the molds to shape the sheet therebetween at only such time when the sheet is in the first position or the second position relative to the upper and lower molds.

The invention provides that the shaping surface of the upper mold is apertured and the upper mold is coupled with a vacuum source so that a vacuum can be drawn through the apertured shaping surface to retain the sheet against the upper mold.

DETAILED DESCRIPTION OF THE INVENTION

Figure 1:
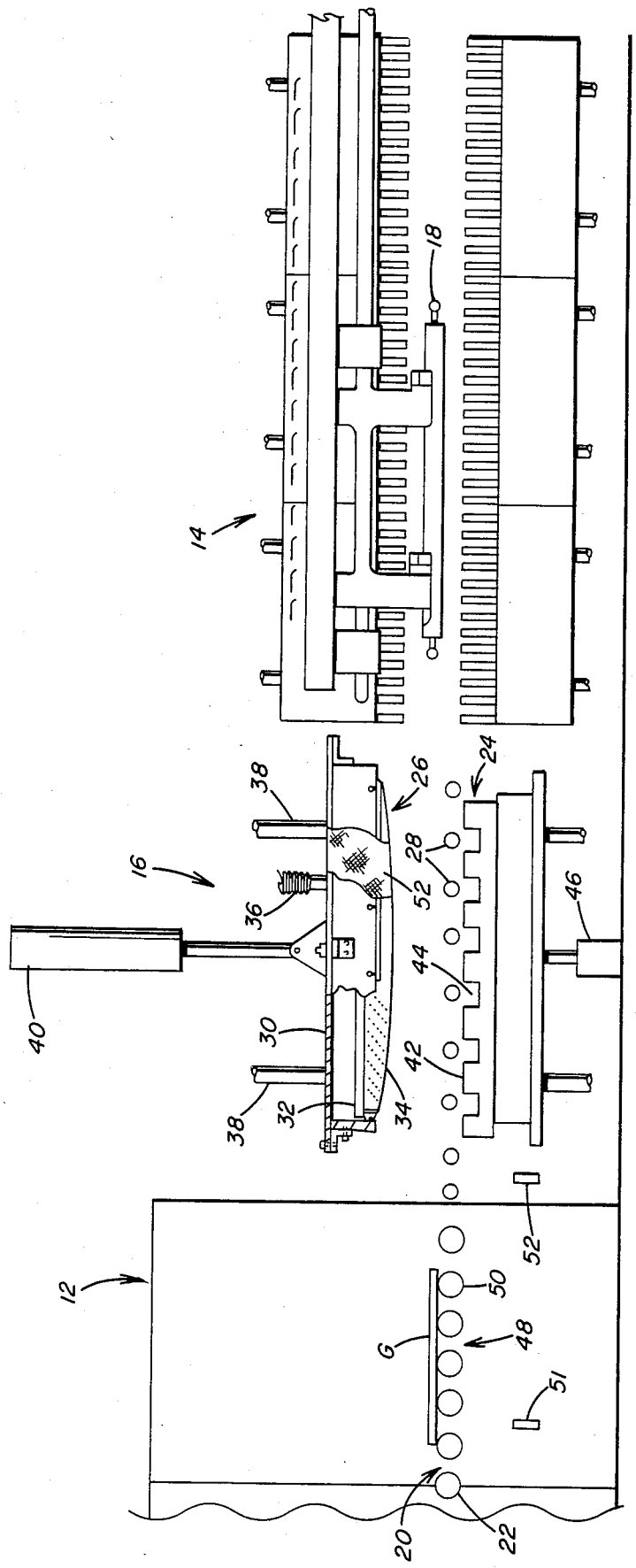
FIG. 1 illustrates a typical horizontal press bending operation showing the shaping mold which is the subject of the present invention.
Figure 2:
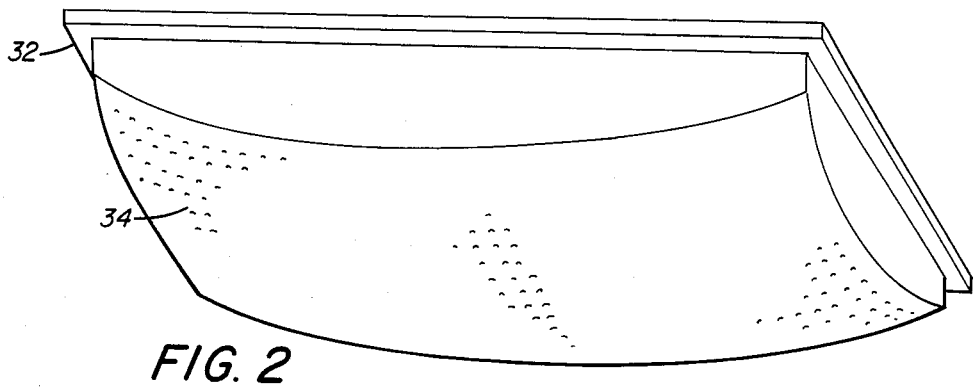
FIG. 2 illustrates an isometric view of the shaping surface of the upper shaping mold.

FIG. 1 of the drawings illustrate a typical apparatus for treating and shaping sheets of heat deformable material. As described in U.S. Pat. No. 4,187,095 to Frank, herein incorporated by reference, the shaping apparatus includes a heating means including a furnace 12 through which sheets of glass are conveyed from a loading station (not shown) while being heated to a glass deformation temperature. A cooling station 14 for cooling the curved sheets of glass and an unloading station (not shown) beyond the cooling station 14 are located in end to end relation to the right of the furnace 12. An intermediate or shaping station 16 is disposed between the furnace 12 and the cooling station 14. The tempering ring 18 located in the cooling station 14 transfers the shaped glass sheet downstream for tempering and transfer to the unloading station.

The furnace 12 includes a horizontal conveyor 20 comprising longitudinally spaced transversely extending conveyor rolls 22 which define a path of travel that extends through the furnace 12 and the shaping station 16. The rolls 22 of the conveyor 20 are arranged in sections and the rotational speed of each section is controlled through clutches (not shown) so that the speed of the different conveyor sections may be controlled and synchronized in a manner well known in the art. Glass sensing elements S1 and S2 detect the movement of a heated sheet as it moves from the furnace 12 to the shaping station 16 and activate various timer circuits to provide synchronizing means for the apparatus of the present invention to be discussed later.

The shaping station 16 comprises a lower shaping mold 24, an upper vacuum mold 26 which are the subject of this invention, and a series of press run in conveyor rolls 28 which are aligned with conveyor 20. As is well known in the art, the upper mold 26 is preferably metal and ceramic construction with a refractory material cover 52, such as fiber glass.

Although not limited in this invention, the upper vacuum mold 26 has an upper metal mounting plate 30 and a lower ceramic wall 32 that is apertured. The lower wall 32 has a shaping surface 34 shaped to the desired configuration of the glass sheet to be shaped. The upper vacuum mold 26 communicates with a source of vacuum (not shown) through an evacuation tube 36 and a suitable valve (not shown). The upper vacuum mold 26 is suitably connected through upper vertical guide rods 38 to an upper supporting frame (not shown) and movable relative thereto by an upper vertical piston 40. The upper vacuum mold 26 is readily detached from its upper mounting plate 30 to permit rapid substitution of another vacuum mold 26 conforming to a different production pattern.

The lower mold 24 comprises an upper surface 42 conforming in elevational shape to the shape desired for the glass sheet to be bent and complements the shaping surface 34. The upper surface 42 is interrupted by intermittently transversely extending grooves 44 which provide clearance for raising and lowering the lower shaping mold 24 between a recessed position below the press run in conveyor rolls 28 which position the glass sheet within the shaping station and an upper position above the level of the conveyor rolls 28. The lower shaping mold 24 is raised and lowered by lower vertical piston 46 and is readily detachable from the shaping station 16 to substitute another mold 24 for a different production pattern.

The molds 24 and 26 of the present invention can shape different glass sheet patterns without changing molds and are particularly adapted to shape left and right hand side windows that are mirror images of each other. This utility is especially useful when the side windows have an asymmetric curvature in the longitudinal, as-installed direction that is, the glass sheets to be shaped have a first constant curvature over a major portion of the glass sheet with a second curvature in the remaining portion. As such, the longitudinal curvature of the glass sheet is asymmetric.

Figure 3:
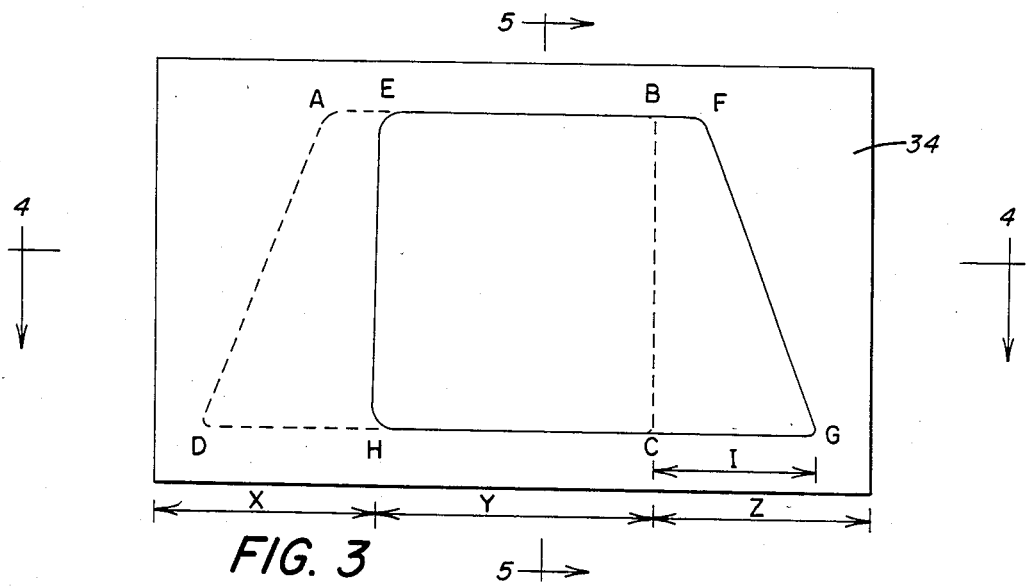
FIG. 3 illustrates a plan view of the shaping mold.

FIG. 3 shows the outline of each glass sheet as it is positioned relative to and formed by the shaping surface 34 of the wall 32 on the upper vacuum mold 26. For reference purposes, it will be presumed that the hot glass sheets move from left to right as viewed in FIG. 3.

Figure 4:
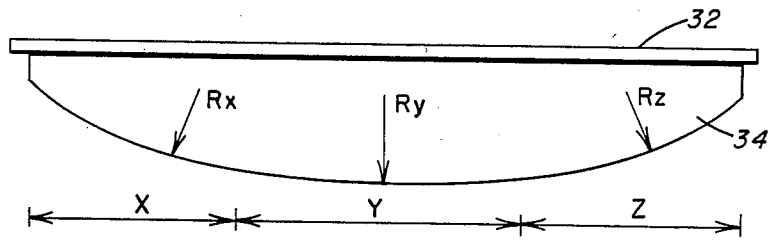
FIG. 4 is a view taken through lines 4—4 of FIG. 3.

Glass sheet ABCD is pressed upstream shaping area X and central shaping area Y of mold 26 while glass sheet EFGH is pressed central shaping area Y and downstream shaping area Z. Sheets ABCD and EFGH are left and right hand side light patterns, having a major portion curved at a first longitudinal radius of curvature and remaining portion curved at a second longitudinal radius of curvature. As shown in FIG. 4 curvature Ry is pressed into each sheet by area Y. Curvature Rx is pressed into a sheet ABCD by area X and curvature Rz is pressed into sheet EFGH by area Z. In the instance of mirror image left and right hand windows, Rx equals Rz.

As an alternative, upper mold 26 could be elongated so that area Y is twice as long as that shown in FIG. 3. Glass sheet ABCD could be pressed by area X and one-half of Y while sheet EFGH could be pressed by Z and the other half of area Y, thus forming both sheets with a single mold. However, it has been found that with longer parts, a critical limitation exists in that the leading edge of the glass sheets starts to cool as soon as it leaves the oven. As a result, it is highly desirable to press the glass sheet as soon as possible after it leaves the furnace. To overcome this limitation, the main portion of each sheet is formed by a single area Y as shown in FIG. 3. The pressing surface of sheets ABCD and EFGH essentially overlap with area Y being used to press both sheets. As a result the travel distance of sheet EFGH as it moves from left to right in FIG. 3 is reduced, allowing it less time to cool.

The lower mold 24 complements the shaping surface 34 of the upper mold 26. The upper surface 42 of the lower shaping mold 24 is preferably smoothly shaped to avoid imparting any irregularity on the supported glass surface, composed of a material that does not react with glass, easily shaped to the smoothly surfaced contour desired, and has good durability despite intermittent contact with hot glass that causes rapid cyclical temperature variations over an extended period. As with the upper mold 26, the lower mold 24 has several pressing sections with a central portion that is used to shape both left and right hand parts. Since the lower mold 24 fully complements the upper mold 26, it does not have to be changed when the shaping operation switches from a left hand part to a right hand part.

Figure 5:
FIG. 5 is a view taken through lines 5—5 of FIG. 3.

FIG. 5 illustrates the transverse curvature of the upper mold 26. It should be noted then when transverse curvature R1, R2, and R3 are all equal, mirror image sheets ABCD and EFGH can both be formed by bending only in the X and Y sections of the upper mold 26. This can be accomplished by simply flipping sheet ABCD 180° about its longitudinal, as conveyed axis. The same is true when the transverse curvature follows a pattern similar to the longitudinal curvature as established by Rx, Ry, and Rz, that is, the center portion having a transverse curvature R2 with two flanking portions having curvatures R1 and R3, where R1 and R3 are equal. Although the present invention can easily be utilized in the previously discussed situation, the advantages of the present invention are most obvious when the transverse curvature of the mirror image side light are not uniform or symmetric, i.e., when R1, R2, and R3 are unequal. In such a case, rather than requiring separate molds for pressing the left hand and right hand parts, the use of the molds 24 and 26 enable both parts to be shaped with a single set of upper and lower molds.

In operation, glass sheet G in FIG. 1 is conveyed through the furnace 12 by furnace rolls 22. As the glass sheet G enters the high speed run out zone 48 of the furnace 12 it is detected by sensor S1 which initiates a timing sequence. The timer is set so that as the trailing edge of the glass sheet G enters a high speed run out zone 48, high speed run out rolls 50 accelerate to match the linear speed of press run in rolls 28. The glass sheet G is conveyed onto the rolls 28 in the shaping station 16. The first timing sequence continues until the glass sheet G is out of the furnace 12. At that time, the high speed run out rolls 50 return to their normal furnace speed.

When glass sheet G enters shaping station 16 it is detected by sensor S2 which initiates a preprogrammed deceleration sequence and a second timing sequence. In the deceleration sequence, the speed of run in rolls 28 is reduced to decelerate the glass sheet G. At the same time, the second timing sequence activates lower mold 24 to lift the glass sheet G off rolls 28 and into engagement with upper vacuum mold 26 when glass sheet G is in the proper position in shaping station 16. After the sheet G is lifted, mold 24 is lowered and the rolls 28 return to their high speed run in conveying rate. Next the tempering ring 18 enters the shaping station 16 to receive the glass sheet G from the upper mold 26 and transfer it to the cooling station 14.

Sensors S1 and S2 are preferably photo eye sensors but in operation can be any type of sensor capable of detecting the presence of the sheet G and initiating an operating sequence.

Rather than initiating timing sequences, the sensors S1 and S2 can initiate counter sequences. In this arrangement, the number of times a specific roll rotates is monitored to determine the position of the glass sheet G after it passes the sensor.

In switching from a left hand pattern to a right hand pattern, some changes must be made. A new tempering ring must be installed to handle the new glass sheet. In addition, the timing of the second timing sequence initiated by the sensor S2 must be changed to account for different travel distance from the furnace 12 to the correct position within the shaping station 16. For example, if glass sheet ABCD is the first sheet formed and moves from left to right as viewed in FIG. 3, when the sheet EFGH is formed, the second timing sequence must be adjusted to allow leading edge FG to travel a distance I, equal to the distance from point C to point G, in order to be correctly positioned between the molds 24 and 26. If the second timing sequence is not adjusted, corner G of sheet EFGH would only travel as far as corner C of sheet ABCD before lower mold 24 engages the sheet, resulting in a bent glass sheet with the wrong curved configuration.

As an alternative to changing the timing of the second timing sequence, the position of the sensor S2 can be changed. For example, as discussed above, the sheet EFGH must travel an additional distance I in order to be properly positioned. Rather than changing the timing of the second timing sequence, the sensor S2 can be moved toward the shaping station 16 the distance I to account for this additional movement.

It should be noted that although the present invention has great utility in forming left and right hand mirror image parts, it can also be used for dissimilar parts. For example, the sheets ABCD and EFGH need not be of identical shape. As long as a portion of each sheet has a curvature of $R_y$ and the remaining portion has a curvature of $R_x$ and/or $R_z$ and the pressing section X, Y and Z of the mold 24 and 26 are large enough to accommodate the sheets, there is no need to change the molds when operation calls for switching from sheet ABCD to EFGH. Furthermore, as long as sheets do not have to be shaped as mirror images of each other, the longitudinal curvature $R_x$, in the section X does not have to equal the longitudinal curvature $R_z$ in section Z. As a result sheets ABCD and EFGH can have the same overall pattern when flat but different curvatures when shaped.

The curvature in areas X and Z need not be uniform. For example, these areas could have constantly changing radii, several discrete constant longitudinal radii, or some combination of the two, but such a variation does not effect the present invention. In forming mirror image windows, the curvatures in each area must be mirror images of each other, while in forming dissimilar part, the curvature in areas X and Z can be completely different.

The the invention shown and described in this disclosure represents an illustrative preferred embodiment thereof. It is understood that various changes may be in the structure and method of operation without departing from the gist of the invention except insofar as defined in the claimed subject matter that follows.

I claim:

1. An apparatus for conveying and shaping a series of heat softened material sheets comprising:
   a reciprocating mold with a shaping surface having and upstream shaping area, a central shaping area and a downstream shaping area, said upstream and central shaping areas forming a first sheet shaping region and said downstream and central shaping areas forming a second sheet shaping region;
   means to engage said sheet with said mold for shaping said sheet; and
   control means including means to detect said sheet at a set position upstream from said mold and means to actuate said engaging means when said sheet has moved either a first distance from said set position, wherein said sheet is at a first position for engagement with said first sheet shaping region or a second distance from said set position wherein said sheet is at a second position for engagement with said second sheet shaping region, depending on the final desired curvature of said sheet.

2. An apparatus as in claim 1 wherein said mold is an upper mold and further including a reciprocating lower mold positioned generally below said upper mold, with an upwardly facing sheet engaging surface that complements said upstream central and downstream shaping areas of said upper mold and said engaging means includes means to move said lower mold and said upper mold relative to each other when said sheet is in either said first or second position, so that said sheet is shaped therebetween.

3. An apparatus as in claim 2 further including a furnace to heat said sheets and means to convey said sheets through said furnace and between said upper and lower molds.

4. An apparatus as in claim 3 wherein said shaping surface of said upper mold is apertured and further wherein said upper mold is coupled with a vacuum source so as to draw vacuum through the apertured shaping surface to retain said sheet against said upper mold.

5. An apparatus as in claim 4 further including means to remove said sheet from said shaping station and move it into a cooling station.

6. An apparatus as in claim 1 wherein said actuating means of said control means is capable of actuating said engaging means when said sheet is at any position between said first and second position.

7. A method of shaping glass sheets comprising:
conveying a first glass sheet through a heating furnace towards a shaping station to heat said first glass sheet to its heat softened temperature;
detecting the position of said first sheet as it is conveyed past a preset location during said conveying step;
activating a first positioning sequence to allow said conveying of said first sheet to continue until said first sheet is at a first position relative to a sheet shaping surface at said shaping station, said first position being a first distance downstream from said preset location;
engaging said first sheet with portions of a first shaping region of said sheet shaping surface including an upstream shaping area and a central shaping area to impart a first desired shape;
depositing said first sheet on a first tempering ring corresponding to the bent shape of said first sheet; and thereafter
conveying a second sheet through said furnace towards said shaping station to heat said second sheet to its heat softened temperature;
detecting the position of said second sheet as it is conveyed past said preset location;
activating a second positioning sequence to allow said conveying of said second sheet to continue until said second sheet is at a second position relative to said sheet shaping surface, said second position being a second distance downstream from said preset location;
engaging said second sheet with portions of a second sheet shaping region of said sheet shaping surface including a downstream shaping area and said central shaping area to impart a second desired shape; and
depositing said second sheet on a second tempering ring corresponding to the bent shape of said second sheet.

8. A method as in claim 7 further including the step of activating a positioning sequence to allow the conveyance of a glass sheet to any position between said first and second positions and engaging said sheet with only that portion of said sheet shaping surface required to impart the desired shape to said glass sheet.

* * * * *